Dec. 9, 1958  H. L. OLSON ET AL  2,863,378
TOASTERS
Original Filed Dec. 15, 1951  4 Sheets-Sheet 3
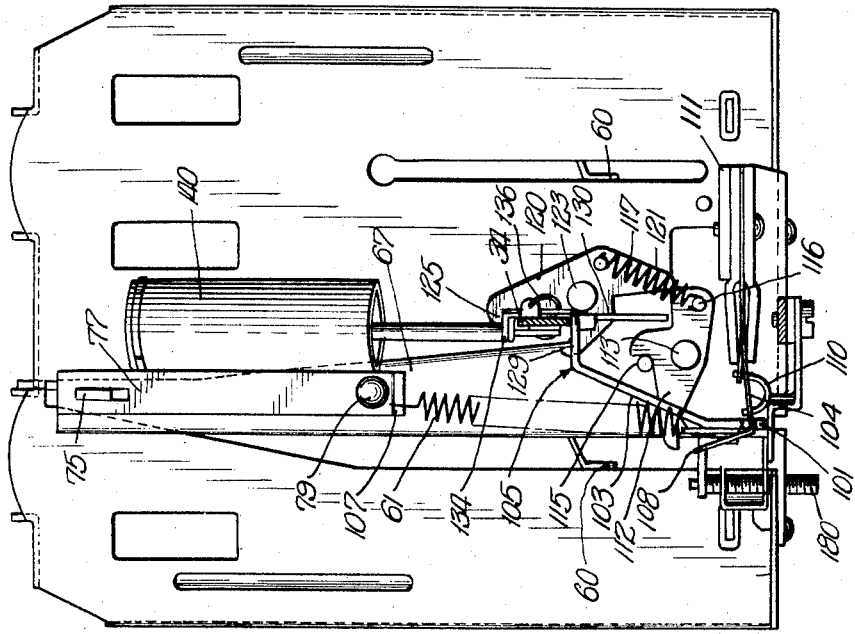
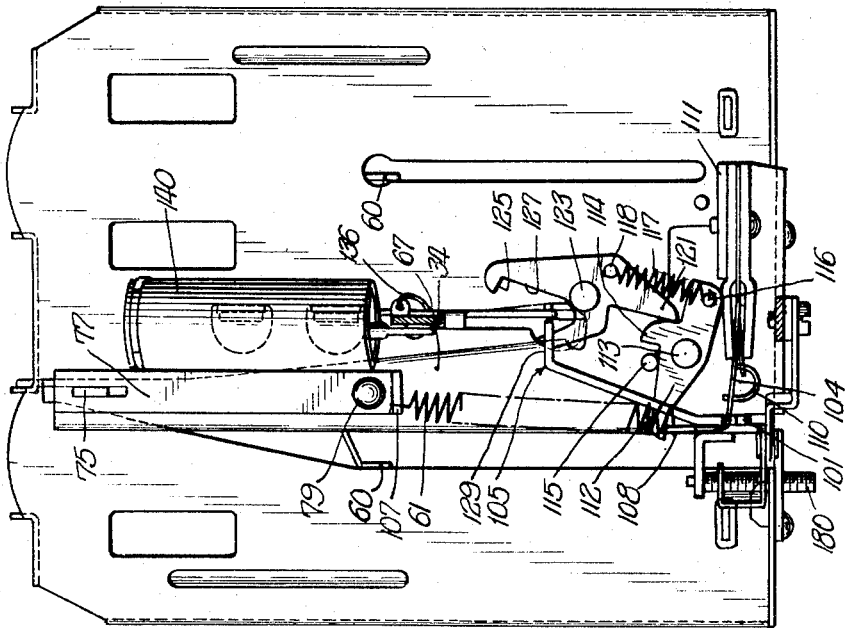
INVENTORS.
Henry L. Olson,
BY Robert A. Miller,
William F. Hale Dec. 9, 1958 H. L. OLSON ET AL 2,863,378
TOASTERS
Original Filed Dec. 15, 1951 4 Sheets-Sheet 4
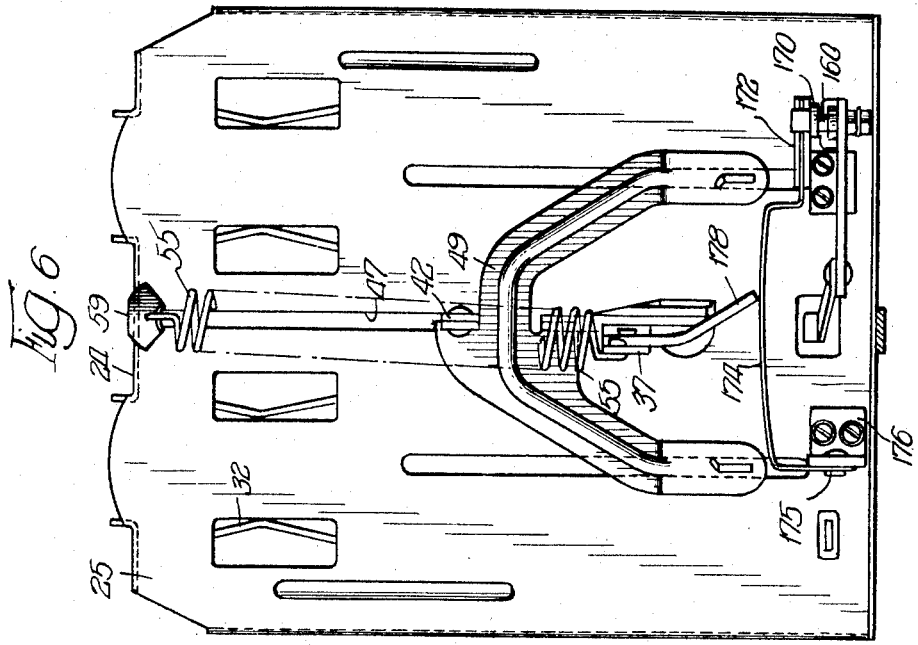
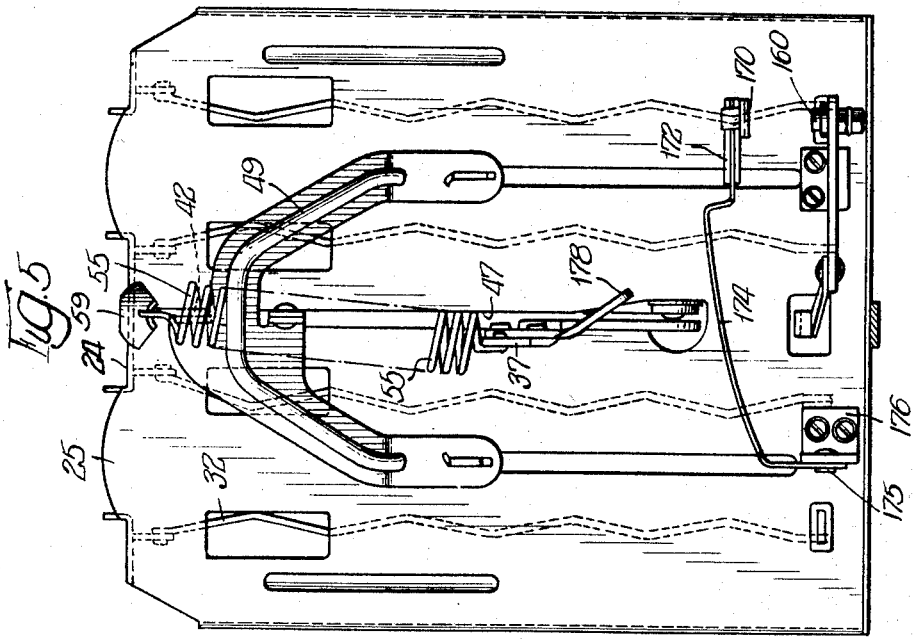
INVENTORS.
Henry L. Olson,
BY Robert A. Miller,
William F. Hale,

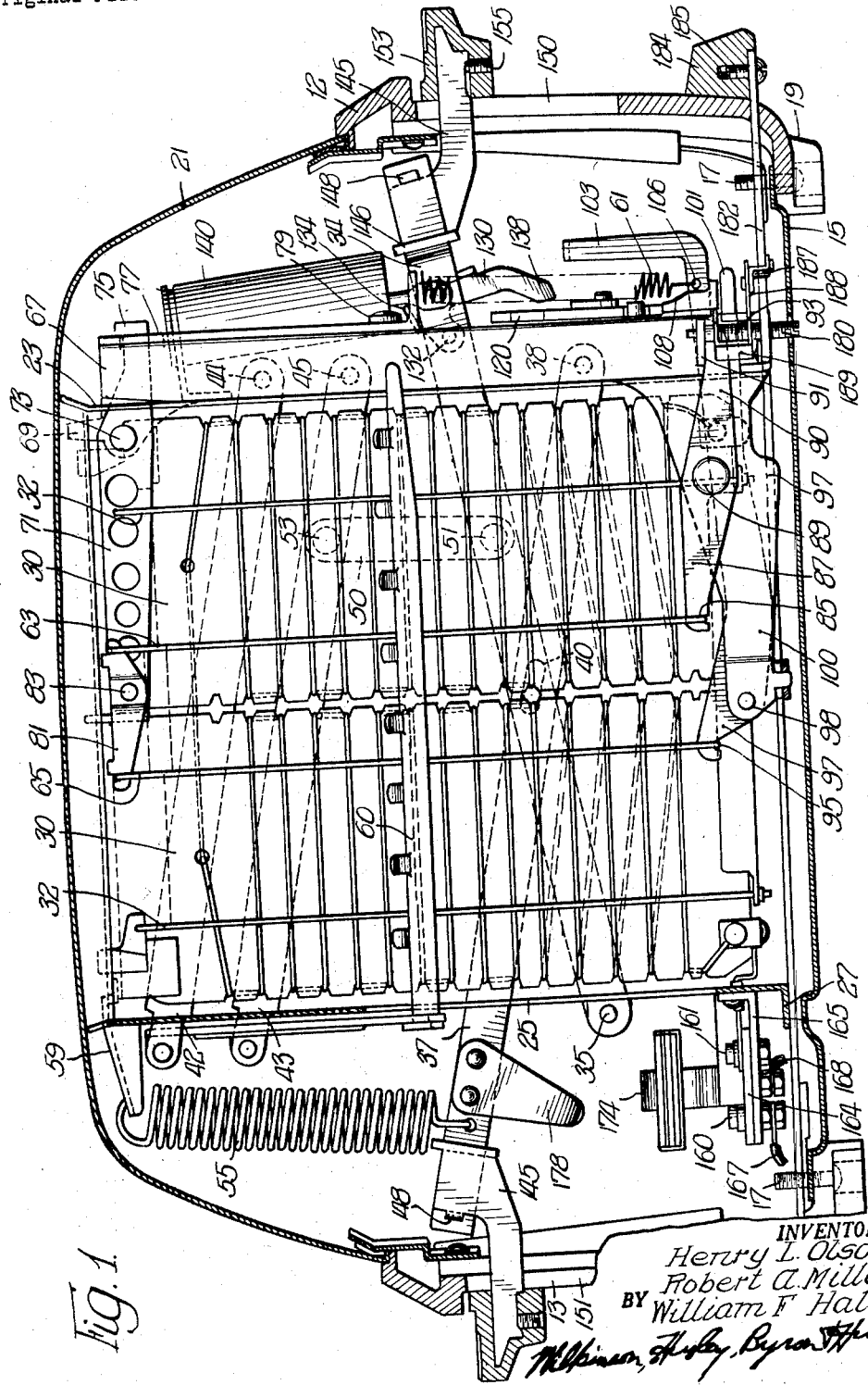

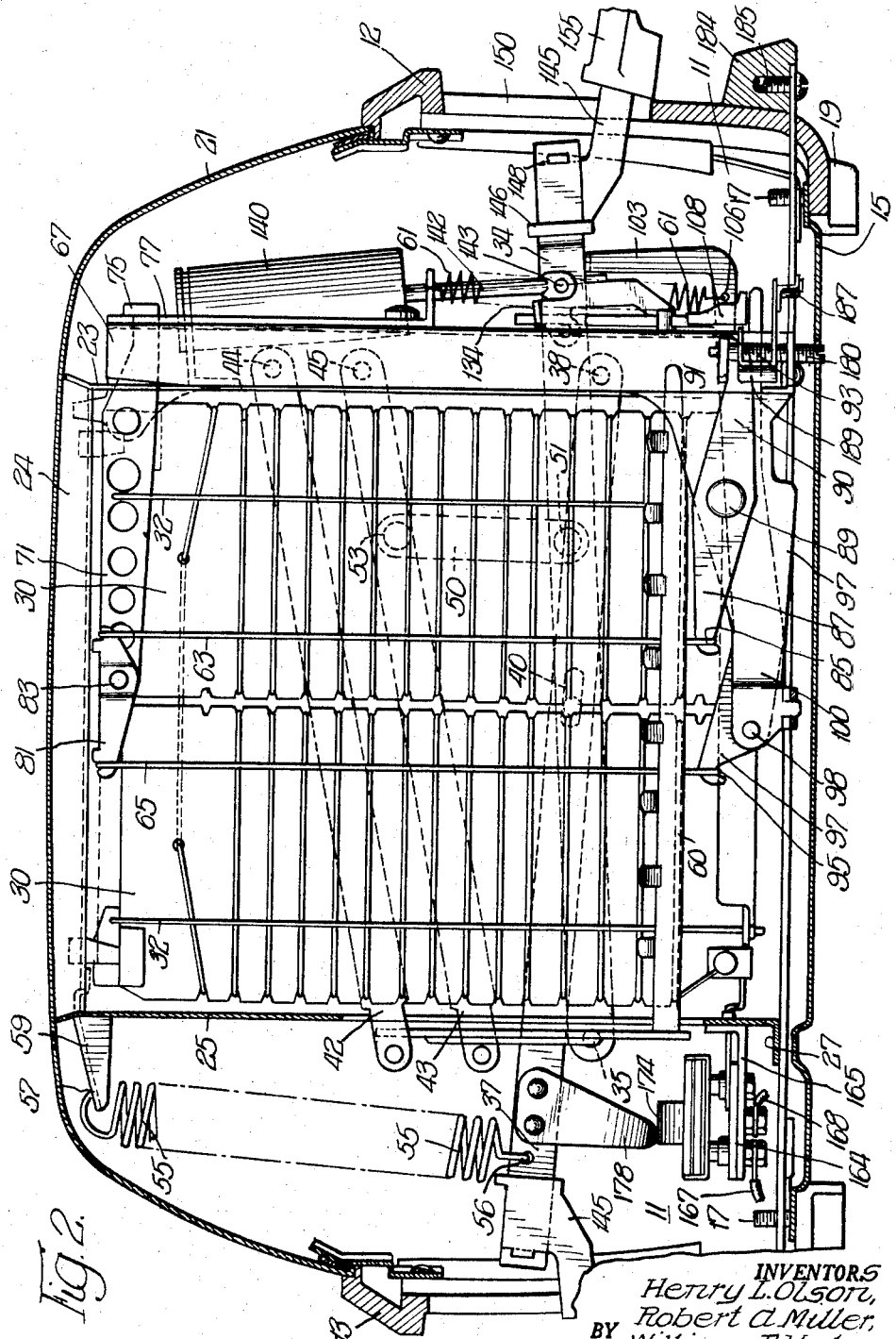

United States Patent Office 2,863,378
Patented Dec. 9, 1958

2,863,378

TOASTERS

Henry L. Olson and Robert A. Miller, Grand Haven, and William F. Hale, Spring Lake, Mich., assignors to Camfield Manufacturing Company, Grand Haven, Mich., a corporation of Michigan Original application December 15, 1951, Serial No. 261,802, now Patent No. 2,692,549, dated October 26, 1954. Divided and this application November 23, 1953, Serial No. 393,642

3 Claims. (Cl. 99—391)

This invention relates to a new and improved automatic toaster and more particularly to a toaster in which the release mechanism is brought into operation by heat from the surface of the bread being toasted.

This application is a division of our copending application for a Toaster, Serial No. 261,802, filed December 15, 1951 which has resulted in Pat. No. 2,692,549 on October 26, 1954.

Automatic or pop-up toasters have heretofore been operated and controlled by a wide variety of means and mechanisms. Such a toaster is expected to be able to produce continuously toast which is uniform in color and texture. A toaster which makes a slice of toast from a cold start will take much longer than is required for succeeding slices and usually will not reach a constant temperature until after several cycles of operation. Consequently the earlier clockwork mechanisms were unsatisfactory and required the addition of thermally responsive speed controls. Other devices were developed which operated entirely from thermally actuated members such as bi-metallic strips.

Thermally actuated members which operate either directly or indirectly by the heat generated by the electric current have been found to have rather wide differences in timing control under variation in line voltage and line power factor. Under extremes of low voltage they may fail entirely to function. Compensation is necessary to maintain uniformity of result with repeated consecutive toasting cycles. Such controls also do not provide for variations in the toasting cycle with differences in the moisture content of the bread. In addition, it is not possible to reheat cold toast without burning it as it must go through a full toasting cycle unless the toaster is manually released.

It is an object of the present invention to provide a new and improved electric toaster of the automatic type.

It is a further object to provide a toaster which will produce uniform toast of the selected color regardless of wide variations in line voltage and power factor.

It is an additional object to provide a toaster which will function to produce uniform toast through repeated consecutive toasting cycles.

It is also an object to provide a toaster which may be used, with automatic operation, to reheat cold toast without excessive darkening or burning.

It is another object to provide a toaster in which the release is put into operation by heat transmitted from the toast surface.

It is a further object to provide such a toaster with a snap-action, quick release.

It is an additional object to provide a toaster having a simple, manual release from toasting position.

It is also an object to provide a toaster in which the mechanism is compensated for toaster tempertaure.

Other and further objects will appear as the description proceeds.

We have shown certain preferred embodiments of our invention in the accompanying drawings in which—

Figure 1 is a side elevation, partly in section, showing the toaster with the housing partly removed and with the parts in the upper position;

Figure 2 is a view similar to Figure 1, but showing the parts with the toaster in the toasting position;

Figure 3 is an end elevation of the toaster mechanism as seen from the right of Figures 1 and 2 and with the parts in the raised position;

Figure 4 is a view similar to Figure 3, but showing the parts in the lower or toasting position;

Figure 5 is a view similar to Figure 3, but showing the left or switch end of the toaster with the parts in the raised position and the switch open; and Figure 6 is a view similar to Figure 5, but showing the parts in the lower position with the switch closed.

Referring first to the construction as generally shown in Figures 1 and 2, the toaster mechanism is supported in a lower housing member 11 to which are secured end closure plates 12 and 13. These plates 12 and 13 are also secured to a bottom closure plate 15 by means of the screws 17. The plates 12 and 13 are shown as provided with integral feet 19 for supporting the assembly in spaced position above a tabletop or other surface. The housing is completed by an upper housing member 21 which is secured to the lower housing member and which, it will be understood, is provided with usual openings in its upper surface for the introduction and removal of bread to be toasted.

The toaster mechanism generally is supported on a U-shaped frame having a downwardly extending right end plate 23, an upper horizontal connecting portion 24 and a left downwardly extending end plate 25, as shown in Figures 1 and 2. This frame plate has out-turned feet 27 and 28 which extend across and have their ends connected to the lower casing member 11. The interior mechanism is thus removable as a unit from the housing by taking out the connecting screws which are not shown. The housing supports a plurality of generally similar heating elements 30 which consist in resistance wire wound on mica, as is customary in the art. The bread is placed down between the pairs of heating elements, being spaced from the elements by the usual crimped wires such as indicated at 32.

A linkage is provided for raising and lowering the toast, this linkage being so connected that it is operable from either end of the toaster. The right operating lever 34 extends through the center of the toaster between the intermediate heating elements and has its left end pivoted at 35 to the left end portion 25 of the frame member. Similarly the left-hand operating lever 37 extends through parallel and adjacent to the lever 34 and is pivoted at 38 to the right end 23 of the frame. The two levers are connected by pin and slot arrangement, as indicated generally at 40, by means of which downward movement of one lever causes similar downward movement of the other lever. The mechanism also includes a pair of intermediate levers 42 and 43, the ends of which are pivoted at 44 and 45 to the right-hand frame member 23. The opposite ends of these levers pass through the vertical slot 47 shown in Figures 5 and 6 in the left end frame member 25 and are pivotally connected to a yoke 49. These intermediate levers, due to their parallel movement, cause the yoke 49 to move upwardly and downwardly parallel to the surface of the frame member 25. The movement of these intermediate levers and the yoke is caused by connecting link 50 which has its lower end pivotally connected at 51 to the right-hand main lever 34 and its upper end pivotally connected at 53 to the lower intermediate lever 43. The actuating spring 55 has its lower end connected at 56 to the operating lever 37 and its upper end connected at 57 to a bracket 59 extending laterally from the left frame member 25. This spring 55 is a tension spring and normally maintains the parts in the position shown in Figure 1. Bread carriers 60, such as shown in Figure 1, extend inwardly from yoke 49 to support the slices between the heating elements.

The mechanism for causing the release of the latch for holding the bread supporting mechanism down is spring actuated, the spring 61 operating against the tension of the wires 63 and 65 which are elongated by heat radiated from a slide of bread placed adjacent said wires. It will be noted from Figures 1 and 2 that these wires 63 and 65 replace two of the usual crimped wires 32 for keeping the bread spaced from the heating elements 30.

The control support frame member 67 is generally U-shaped in horizontal cross section and is secured to and projects outwardly from the right end plate member 23. It also has an integral arm extending inwardly of the plate 23, this arm having an upwardly extending ear 69. The pivoted arm 71 is pivotally secured at 73 to the inner portion of control frame 67. This pivoted arm 71 has a right arm portion 75 extending outwardly through an opening in a link 77 which is secured to the frame member 67 by a rivet at 79. This link 77 is preferably formed of some material such as brass which has a higher co-efficient of expansion than the steel of which the frame member 67 is formed. It will be understood that the particular materials used may be varied, the important feature being that the link 77 has a greater co-efficient of expansion than the frame 67 to which it is secured. The pivoted support arm 71 carries adjacent its left end, a short lever 81 mounted on a pivot 83 on the arm 71. The upper end of the actuating wire 65 is secured at the left end of lever 81 while the upper end of wire 63 is secured at the right end of the same lever. It is to be noted that there is a 2 to 1 ratio between these arms, the left end supporting wire 65 being longer.

The lower end of wire 63 is connected at 85 to the left end of a lever 87 pivotally supported from the lower portion of the control frame 67 at 89. The right end 90 of this lever 87 has a horizontally extending ear 91 which is engaged by the upper end of the adjusting screw 93. This adjusting mechanism will be described in detail hereinafter. It will be noted, however, that the point of connection at 85 between the wire 63 and the arm 87 serves as a fixed starting point for the movable linkages connected by the wire 63, the pivoted lever 81, and the wire 65. The lower end of wire 65 is connected at 95 to the left end of the release lever 97. This release lever 97 is pivoted at 98 on a fixed arm 100 which extends rearwardly from the control frame member 67. This release lever 97 extends to the right beyond the control frame member 67 and has a bifurcated end with a short lower ear 101 and an upwardly extending arm 103, which arm has a laterally extending end portion 105, as shown in Figures 3 and 4. The latch release spring 61 has its lower end connected at 106 to the lower portion of this arm 103 of release lever 97. The upper end of this spring 61 is connected at 107 to an out-turned end of the link 77. It will be understood, however, that the connection at this point is merely for purposes of convenience, it only being essential that the spring be attached to a fixed portion of the end frame so as to impart a tension which tends to raise the right end of lever 97.

Referring next to Figures 3 and 4, these figures show the latch mechanism in the "off" and "on" position, respectively. The snap spring 104 is secured to an extension 111 of the frame member 67 and is provided with an upturned end 108 which serves as a kick-off for the latch. The portion of the spring 104 immediately adjacent the upturned end 108 passes through the bifurcated end of the release lever 97 above the lower ear 101 and below the upper portion adjacent the arm 103. The spring 104 is provided with a well-known type of snap-over device including an arcuate spring 110 so that once it passes over center, it is suddenly snapped in either direction.

The latch holding member 112 is pivoted at 113 on the lower face of the frame member 67. Its movement is limited by an upwardly extending lug 114 coacting with a stop pin 115 mounted on member 67. The left end of the latch holding lever 112 extends over above the upturned portion 108 of the member 105 and with the member 105 in its upper position, the parts are as shown in Figure 3. The right end of the lever 112 is provided with a pin 116 to which is secured one end of a tension coil spring 117. The opposite end of spring 117 is secured to a pin 118 which extends from the latch lever 120. This lever 120 has a lower end 121 which engages a face of the lug 114 of the latch holding lever 112 and limits clockwise movement of the latch lever 120. The latch lever 120 is pivotally supported at 123 on the frame member 67. The upper portion of the latch lever 120 has a holding hook at 125 and adjacent and below that hook is a V-shaped recess 127. The left side of this recess 127 is formed by a second upwardly extending arm 129 of lever 120.

The manual release member 130, best shown in Figures 1 and 2, is pivotally supported at 132 on the right operating lever 34. This manual release lever has a laterally extending ear 134 which overlies the upper edge of the operating lever 34. It is provided with an over-center operating hairpin or U-shaped spring 136 adapted to either hold the release lever in position with the portion 134 engaging the upper edge of operating lever 34 or in the alternative with this portion 134 spaced above the lever 34. The purpose of this is that in the downward position, as best shown in Figure 2, the lower end 138 of lever 130 is inclined inwardly so that this end 138 will engage the upper face of the latch holding lever 112 to swing the latch holding lever 112 in the clockwise direction which permits spring 117 to rotate the latch 120 in the clockwise direction to move the latch hook 125 clear of the portion 134 and thus clear of the right operating lever 34. This, then, permits the operating lever to move upwardly under the influence of the spring 55 at the opposite end of the toaster.

This upward movement is cushioned by the dash pot 140 which contains a piston operated by rod 142, the lower end of which is connected at 143 to the right operating lever 34. As the operating lever 34 moves upwardly, the inner face of the lower portion 138 of the latch release lever 130 engages the outer face of the arm 129 of the latch lever 120 which forces it outwardly and snaps the manual release lever 130 to the outer position in which it is shown in Figure 1. Thus, when the lever 34 is moved downwardly upon insertion of a piece of toast the latch release lever 130 is in such position that its lower end 138 does not engage latch holding lever 112 to prevent proper latching of the lever 34 in the downward position.

For purposes of convenience in assembly and in operation, a removable operating arm 145 is attached to each of the operating levers 34 and 37. This member 145 has a laterally extending portion 146 with an opening such as to fit over the end of the lever 34 or 37 and is provided with a lug 148 fitting in a corresponding perforation in the end of the lever 34 or 37 so that it is rigidly connected as an extension to the lever. The members 145 pass through narrow slots 150 and 151 in the end closure plates 12 and 13, respectively. These narrow slots prevent lateral movement in the members 145 such as to disengage the lugs 148 after the parts are assembled. Finger pieces 153 are secured on the ends of the members 145 by set screws 155.

The switch for closing the heating circuit is shown in Figures 1, 2, 5 and 6, being located in the left end of the assembly, as shown in Figures 1 and 2. A pair of contacts 160 and 161 are carried by an insulating member 164 supported on a bracket 165 extending from the left main frame member 25. These contacts 160 and 161 are connected from below to two wires 167 and 168. Wire 167 may extend to a usual appliance cord and the other wire 168 to the heating elements. The opposite terminal of the heating elements will be provided with a wire which will be parallel with wire 167 in the connecting appliance cord. The specific details of these connections form no part of the present invention. The switch bridging contact 170 is carried on an insulating member 172 supported on the end of a spring arm 174, the opposite end of which is secured at 175 to a bracket 176. This bracket 176 is also secured to the end frame member 25. A spring depressing finger 178 is riveted to the left main lever 37 and extends downwardly so that when the lever 37 is moved downwardly, this finger 178 engages spring 174 to depress the spring, as shown in Figure 6. This causes the bridging contact 170 to bridge a circuit across contacts 160 and 161 to close the heating circuit.

It will be apparent that the wires 63 and 65, when at room temperature, will be of such a length as to pull up on the left end of the release lever 97 causing its right end with ear 101 to be swung downwardly. This permits the snap member 104 to be moved to its lower position with the ear 101 below the member (Figure 4). When a piece of bread is inserted in the side of the toaster carrying the operating assembly including wires 63 and 65, the bread will be closely adjacent or in contact with these wires. The finger piece 153 at either end of the toaster may be depressed and the bread carrier 60 carried by yoke 49 will move downwardly carrying the bread to a lower position where it is fully enclosed within the toaster. As this downward movement takes place, the lower edge of the right operating lever 34 will press against the right face of the arm 129 of the latch 120 swinging that latch in the counter-clockwise direction so that the latch hook 125 rests on top of the lateral portion 134 of the latch release member 130. Since this portion 134 is forced into contact with the upper edge of lever 34 the hook will serve to hold the lever down. The spring 117 tends to rotate the latch 120 in the clockwise direction. Its other end, however, is attached to the latch holding lever 112 and tends to move that in the counterclockwise direction. Since the latch 120 is momentarily held against movement by contact with the lower edge of lever 34 the spring 117 acts to rotate the latch holding member 112 in the counterclockwise direction until the edge of the lug 114 engages stop pin 115. At this point the right edge of member 112 is in front of the lower end of the latch 120 and holds that latch in latched position. It will be apparent that since the arm 108 of member 105 is in its lower position, there is no restraint against movement of the latch holding member 112 in the counter-clockwise direction. The snap-over knock off 104 is also cocked in this position ready to snap over when lifted past center by the ear 101.

The parts are thus latched in the lower position with the bread in toasting position and the downward movement of the left lever 37 has closed the switch, as shown in Figure 6, so that the heating elements begin to heat up. Heat is radiated to the bread which begins to toast. Also, heat is radiated from the bread surface or transmitted by contact to the wires 63 and 65. These wires expand or lengthen under the influence of the heat.

It may be noted at this point that heat is, of course, also radiated to wires 63 and 65 by the adjacent heating element. The controlling factor in the operation, however, is the additional heat radiated or transmitted by contact from the bread surface. The parts are so calibrated that this additional heat serves to control the actuation of the toaster.

By way of example and not by way of limitation, in an actual toaster constructed in accordance with the drawings, it has been found that the wires 63 will expand or lengthen according to the temperature of the toast approximately .004 inch. The pivoted member 81 has a 2 to 1 ratio so that with the lower end of wire 63 fixed, this expansion of wire 63 will permit the left end of member 81 or the upper end of wire 65 to move downwardly .008 inch. The wire 65 is identical with wire 63 and will have an additional .004 inch expansion. This permits a total downward movement of the left end of lever 97 of .012 inch. Lever 91 has an 8 to 1 ratio so that the bifurcated end of that lever, where it engages the snap acting knock-off member 104 will have approximately $\frac{3}{32}$ of an inch movement. Thus, as the heat of the bread surface is raised, the wires 63 and 65 expand and the levers swing in the directions just described. The right end of lever 97 is drawn upwardly by spring 61 which acts to move that end of the lever as permitted by the expansion of the wires.

When the lever 97 has reached such a point that the lower ear 101 of the lever moves the snap acting knock-off member 104 past center, the spring 110 gives it a quick snap action moving its upturned end 108 sharply upward. The upper edge of member 108 hits against the lower face of the left end of the latch holding lever 112, swinging that lever in the clockwise direction about its pivot 113. This movement causes the release of the lower end 121 of the latch 120 and spring 117 swings the latch to the position shown in Figure 3. This releases the right operating lever 34 and the spring 55 raises the parts to the position shown in Figure 1. This lifts the upper portion of the toast to a point above the upper surface of the toaster where it can be grasped by the fingers. It will be apparent that this upward movement also moves finger 178 away from switch spring 174 so that the heating circuit is opened.

If, at any time, during a heating or toasting cycle it is desired to release the catch so that the mechanism will operate under the influence of spring 55 to raise the bread, this may be accomplished by a short downward movement of either finger piece 153. This movement, as previously described, will cause the latch release member 130 to move so that its lower end 138 engages the upper end of the right end of the latch holding lever 112 to rotate that lever in the clockwise direction sufficiently to release the latch 120.

After this manual release has been used the latch release member will move again to its open or inoperative position on the upward movement upon release. It will remain in its open or inoperative position until the main lever 34, or lever 37 has again been depressed and locked at the bottom of its stroke. When the main latch 120 closes at the end of this stroke and pressure is removed from lever 34, or lever 37, the upward force of spring 55 forces lever 34 upwardly and portion 134 of release lever 130 is swung downwardly about pivot 132, swinging the lower end 138 of lever 130 inwardly to its closed or operative position as shown in Figure 2. Thus the manual release is always in operative position when the parts are latched downwardly during a toasting operation.

It will be apparent that the control wires 63 and 65 carry no current, but are controlled entirely as to their expansion by heat which they receive by radiation or by contact. Consequently, the operation of the toaster is entirely independent of any variations in the line voltage applied to the toaster. The same is true, of course, as to wide variations in the line power factor of the electrical supply to the toaster. The toast will also be uniform regardless of the moisture content of the bread being toasted. If the bread is moist, the drying off of the moisture will have a cooling effect on the control wires so that the toasting cycle will be properly prolonged and will adequately and uniformly toast the bread after excess moisture is driven out.

Also, the toaster, as designed, will operate uniformly throughout consecutive toasting cycles. The frame member 67 will increase in height as the toaster gradually heats up, this member being made of steel in the preferred form. This increase in height would have the effect of modifying the actuation of the toaster were no compensation provided. The expansion would be in the opposite direction to the operating expansion of the wires desired, in that it would raise the upper ends of the wires. To take care of this, the upper end of the wires are supported from the pivoted arm 71 which is supported from the frame member 67. The short end 75 of this arm 71, however, extends through the compensating link 77 which may be formed of brass. This member 77 will expand to a greater extent than member 67 so that as the pivot 73 moves upwardly, the right end 75 of the arm 71 moves upwardly more rapidly than the pivot. The ratio of the two arms of the member 71 is such as to properly compensate for the expansion of the support frame 67. The toasting cycle will thus be uniform regardless of the temperature of the interior of the toaster and of the frame member 67. It will be understood that various materials may be used for the frame 67 and for the compensating member 77 and that the lever arms provided for the members 71 which will be dependent upon the ratios of expansion of the members 67 and 77.

It has been pointed out that the screw 93 served to raise or lower the right end 90 of lever 87 so as to adjust for the desired darkness or lightness of toast. This screw may be adjusted from below by a screw driver engaging the head 180. Means are also provided for manual adjustment of the character of the toast while the toaster is in use. These means comprise a long lever 182 pivoted at the center of the underface of the toaster mechanism with ends of the lever extending outwardly at each end of the toaster. These ends carry operating knobs 184 held in place by screws 185. This color control bar 182 is connected by link 187 to a long arm 188 of a U-shaped member 189 which is fitted about the screw 93 so that the screw passes through both legs of the member. This member 189 engages screw 93 with sufficient frictional force so that movement of the color control bar 182 will, through link 187, swing the member 188 and turn the screw 93 to vary the screw adjustment. This frictional contact is not, however, great enough to prevent rotation of the screw 93 by a screw driver without disturbing the adjustment of the color control bar.

While we have shown certain preferred embodiments of our invention, it will be understood these are illustrative only and that various modifications may be made to take care of differing conditions and requirements. We, therefore, contemplate such variations as come within the spirit and scope of the appended claims.

We claim:

1. In an automatic toaster or the like, a toasting oven, a movable carrier means for supporting bread in the oven including an operating lever adapted to move the carrier means into toasting position manually, said carrier means being biased into non-toasting position, a latch movable to its release position mounted in said toaster for pivotal movement into latching relationship with said carrier means by downward movement of said carrier means into toasting position, a locking lever pivotally mounted to lock said latch in said latching relationship, said latch and said locking lever having resilient connection means for effecting said movement of said locking lever, a release lever movable by said operating lever in a direction tensioning said resilient connecting means to urge the latch to its release position and to pivot said locking lever to its latch release position, said release lever having secured thereto an overcenter operating spring adapted to dispose said release lever in position to engage said locking lever to effect said pivotal movement thereof or in position to bypass said locking lever selectively.

2. In an automatic toaster or the like, a toasting oven, a movable carrier means for supporting bread in the oven including an operating lever adapted to move the carrier means into toasting position manually, said carrier means being biased into non-toasting position, a latch movable to its release position mounted in said toaster for pivotal movement into latching relationship with said carrier means by downward movement of said carrier means into toasting position, a locking member movable into position to maintain said latching relationship by said pivotal movement of said latch, resilient means interconnecting said latch and said locking member for moving said locking member to its locking position, and a release lever movable by said operating lever in a direction to tension said resilient means to urge the latch to its release position, said release lever having secured thereto an overcenter operating spring having a U-shaped configuration adapted to dispose said release lever in position to engage said locking member and move it to its unlocking position when said operating lever is subsequently moved, said release lever having a laterally extending ear adapted to overlie the upper edge of said operating lever and said latch having a hook for engaging said ear when said carriage is in its toasting position.

3. In an automatic toaster or the like, a toasting oven, a movable carrier means for supporting bread in the oven including an operating lever adapted to move the carrier means into toasting position manually, said carrier means being biased into non-toasting position, a latch pivotally mounted in said toaster and adapted to be moved into latching position upon movement of said carrier means and said operating lever into toasting position, a locking lever pivotally mounted in said toaster for locking said latch in latching position, means biasing said latch into release position including a resilient element connecting said latch and said locking lever across the point of their locking interengagement to maintain said latch in its latching position upon said movement of said carrier means and said operating lever into toasting position, and means controlled by the operating lever for moving said lever out of said latch-maintaining position upon subsequent downward movement of said operating lever.

References Cited in the file of this patent

UNITED STATES PATENTS

| | | |
|---|---|---|
| 2,254,946 | Ireland | Sept. 2, 1941 |
| 2,336,640 | Sardeson | Dec. 14, 1943 |
| 2,541,207 | Cole | Feb. 13, 1951 |
| 2,542,231 | Campbell | Feb. 20, 1951 |
| 2,548,680 | Olson et al. | Apr. 10, 1951 |
| 2,555,697 | Lillyblad et al. | June 5, 1951 |
| 2,585,465 | Humphrey | Feb. 12, 1952 |
| 2,591,886 | Snyder | Apr. 8, 1952 |
| 2,622,505 | Olson et al. | Dec. 23, 1952 |
| 2,692,549 | Olson et al. | Oct. 26, 1954 |